(12) United States Patent
Manson (10) Patent No.: US 8,965,592 B2
(45) Date of Patent: Feb. 24, 2015

(54) SYSTEMS AND METHODS FOR BLACKOUT PROTECTION

(75) Inventor: Scott M. Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 158 days.

(21) Appl. No.: 13/587,068

(22) Filed: Aug. 16, 2012

(65) Prior Publication Data

US 2013/0018521 A1    Jan. 17, 2013

Related U.S. Application Data

(63) Continuation-in-part of application No. 13/195,227, filed on Aug. 1, 2011.

(60) Provisional application No. 61/376,348, filed on Aug. 24, 2010, provisional application No. 61/592,829, filed on Jan. 31, 2012.

(51) Int. Cl.
| | |
|---|---|
| G05D 3/12 | (2006.01) |
| G05B 11/01 | (2006.01) |
| G06F 1/00 | (2006.01) |
| H02J 3/14 | (2006.01) |
| H02J 13/00 | (2006.01) |

(52) U.S. Cl.
CPC .............. *H02J 3/14* (2013.01); *H02J 13/0006* (2013.01); *Y02B 70/3225* (2013.01); *Y04S 10/18* (2013.01); *Y04S 20/222* (2013.01); *Y04S 20/224* (2013.01); *Y02E 60/724* (2013.01)
USPC .............. 700/292; 700/27; 700/79; 700/286; 713/300; 713/340

(58) Field of Classification Search
USPC ................. 700/21, 79, 177, 286, 292, 295; 713/300, 340
See application file for complete search history.

(56) References Cited

U.S. PATENT DOCUMENTS

| | | | | |
|---|---|---|---|---|
| 4,349,744 | A | * | 9/1982 | Reuther et al. .............. 290/40 C |
| 4,387,336 | A | | 6/1983 | Joy |
| 4,829,298 | A | | 5/1989 | Fernandes |
| 5,006,846 | A | | 4/1991 | Granville |
| 5,224,011 | A | | 6/1993 | Yalla |

(Continued)

OTHER PUBLICATIONS

Larsson et al., Predictive Frequency Stability Control based on Wide-area Phasor Measurements, IEEE, 2002.*

(Continued)

*Primary Examiner* — Darrin Dunn
(74) *Attorney, Agent, or Firm* — John P. Davis; Richard M. Edge (57) ABSTRACT

A system for managing an electric power delivery system is disclosed that includes a set of remote intelligent electronic devices (IEDs) and a central IED. The remote IEDs may be configured to obtain information related to rotor angles, operating frequencies, rate of change of frequency, rotating inertia, and power consumption levels of loads and generators included in the electric power delivery system. The central IED may communicate with the remote IEDs to determine which loads and generators are associated with a sub-grid of the electric power delivery system and whether to disconnected certain loads or generators. Based on this determination, the central IED may direct the remote IEDs to disconnect loads or generators from the electric power delivery system, or to rapidly increase or decrease generator output as appropriate.

32 Claims, 5 Drawing Sheets

(56) References Cited

U.S. PATENT DOCUMENTS

| | | | |
|---|---|---|---|
| 5,341,265 A | 8/1994 | Westrom | |
| 5,446,682 A | 8/1995 | Janke | |
| 5,498,956 A | 3/1996 | Kinney | |
| 5,592,393 A | 1/1997 | Yalla | |
| 5,596,492 A | 1/1997 | Divan | |
| 5,694,281 A | 12/1997 | Roberts | |
| 5,703,745 A | 12/1997 | Roberts | |
| 5,731,943 A | 3/1998 | Roberts | |
| 5,963,404 A | 10/1999 | Guzman-Casillas et al. | |
| 6,028,754 A | 2/2000 | Guzman | |
| 6,236,949 B1 | 5/2001 | Hart | |
| 6,265,881 B1 | 7/2001 | Meliopoulos | |
| 6,285,917 B1 | 9/2001 | Sekiguchi | |
| 6,341,055 B1 | 1/2002 | Guzman | |
| 6,356,421 B1 | 3/2002 | Guzman | |
| 6,356,471 B1 | 3/2002 | Fang | |
| 6,411,865 B1 | 6/2002 | Qin | |
| 6,442,010 B1 | 8/2002 | Kasztenny | |
| 6,446,682 B1 | 9/2002 | Viken | |
| 6,603,298 B2 | 8/2003 | Guzman | |
| 6,608,742 B2 | 8/2003 | Schweitzer | |
| 6,662,124 B2 | 12/2003 | Schweitzer | |
| 6,694,270 B2 | 2/2004 | Hart | |
| 6,757,146 B2 | 6/2004 | Benmouyal | |
| 6,839,210 B2 | 1/2005 | Roberts | |
| 6,845,333 B2 | 1/2005 | Anderson | |
| 6,946,753 B2 | 9/2005 | Kernahan | |
| 7,072,744 B2 | 7/2006 | Kuwabara | |
| 7,116,010 B2 | 10/2006 | Lasseter | |
| 7,196,884 B2 | 3/2007 | Guzman | |
| 7,319,576 B2 | 1/2008 | Thompson | |
| 7,356,422 B2 | 4/2008 | Schweitzer | |
| 7,457,688 B2 | 11/2008 | Szepek | |
| 7,480,580 B2 | 1/2009 | Zweigle | |
| 7,519,454 B2* | 4/2009 | Gardner et al. | 700/286 |
| 7,570,469 B2 | 8/2009 | Guzman | |
| 7,571,028 B2* | 8/2009 | Lapinski et al. | 700/286 |
| 7,582,986 B2 | 9/2009 | Folkers | |
| 7,630,863 B2 | 12/2009 | Zweigle | |
| 7,635,967 B2 | 12/2009 | Loucks | |
| 7,660,088 B2 | 2/2010 | Benmouyal | |
| 7,701,393 B2* | 4/2010 | Bornholdt | 342/451 |
| 7,710,693 B2 | 5/2010 | Guzman | |
| 7,761,910 B2 | 7/2010 | Ransom | |
| 7,765,034 B2* | 7/2010 | Gardner et al. | 700/286 |
| 7,856,327 B2 | 12/2010 | Schweitzer | |
| 7,903,381 B2 | 3/2011 | Fischer | |
| 7,930,117 B2 | 4/2011 | Guzman-Casillas | |
| 8,082,367 B2 | 12/2011 | Etheridge | |
| 8,204,632 B2* | 6/2012 | Abi-Samra | 700/295 |
| 8,410,633 B2 | 4/2013 | Batzler | |
| 8,437,969 B2* | 5/2013 | Zhang et al. | 702/70 |
| 8,560,255 B2 | 10/2013 | Elwarry | |
| 8,849,997 B2* | 9/2014 | Okuno et al. | 709/224 |
| 2004/0021470 A1* | 2/2004 | Adams et al. | 324/522 |
| 2004/0027748 A1 | 2/2004 | Kojovic | |
| 2004/0059469 A1 | 3/2004 | Hart | |
| 2004/0138834 A1 | 7/2004 | Blackett | |
| 2004/0252525 A1 | 12/2004 | Aldridge | |
| 2005/0144437 A1 | 6/2005 | Ransom | |
| 2006/0224336 A1* | 10/2006 | Petras et al. | 702/62 |
| 2006/0259255 A1 | 11/2006 | Anderson | |
| 2007/0086134 A1 | 4/2007 | Zweigle | |
| 2007/0100504 A1* | 5/2007 | Moxley | 700/286 |
| 2007/0103004 A1* | 5/2007 | Chou et al. | 307/64 |
| 2007/0219755 A1* | 9/2007 | Williams et al. | 702/188 |
| 2007/0222294 A1* | 9/2007 | Tsukida et al. | 307/29 |
| 2007/0239372 A1* | 10/2007 | Schweitzer | 702/57 |
| 2008/0040296 A1 | 2/2008 | Bridges | |
| 2008/0204044 A1* | 8/2008 | Ponnaluri et al. | 324/647 |
| 2008/0232005 A1* | 9/2008 | Kuehnle et al. | 361/21 |
| 2008/0281540 A1 | 11/2008 | Zweigle | |
| 2009/0021082 A1 | 1/2009 | Loucks | |
| 2009/0079266 A1 | 3/2009 | McNamara | |
| 2009/0085407 A1 | 4/2009 | Venkatasubramanian | |
| 2009/0088989 A1 | 4/2009 | Guzman | |
| 2009/0088990 A1 | 4/2009 | Schweitzer | |
| 2009/0089608 A1 | 4/2009 | Guzman | |
| 2009/0091867 A1 | 4/2009 | Guzman | |
| 2009/0099798 A1 | 4/2009 | Gong | |
| 2009/0125158 A1 | 5/2009 | Schweitzer | |
| 2009/0198383 A1* | 8/2009 | Gardner et al. | 700/286 |
| 2009/0254655 A1* | 10/2009 | Kidwell et al. | 709/224 |
| 2009/0276173 A1* | 11/2009 | Wang et al. | 702/65 |
| 2010/0002348 A1 | 1/2010 | Donolo | |
| 2010/0104847 A1* | 4/2010 | Ciavatta et al. | 428/297.4 |
| 2010/0114390 A1 | 5/2010 | Stevenson | |
| 2010/0145536 A1 | 6/2010 | Masters | |
| 2010/0152910 A1 | 6/2010 | Taft | |
| 2010/0198423 A1 | 8/2010 | Hirst | |
| 2011/0004324 A1 | 1/2011 | Bickel | |
| 2011/0022734 A1 | 1/2011 | Etheridge | |
| 2011/0062708 A1* | 3/2011 | Prochaska et al. | 290/7 |
| 2011/0068576 A1* | 3/2011 | Meier et al. | 290/7 |
| 2011/0190958 A1* | 8/2011 | Hirst | 700/295 |
| 2011/0213606 A1* | 9/2011 | Seaman et al. | 703/18 |
| 2011/0251732 A1 | 10/2011 | Schweitzer | |
| 2011/0298286 A1 | 12/2011 | Batzler | |
| 2012/0226386 A1 | 9/2012 | Kulathu | |

OTHER PUBLICATIONS

Greg Zweigle, Expand Synchrophasor Capabilities with the Substation Phasor Data Concentrator, Feb. 18, 2010.

Andrew Swinghamer, Create a Synchrophasor Network with the SEL-3378 Synchrophasor Vector Processor, Aug. 6, 2009.

Yanfeng Gong, Using Synchrophasor-Based Modal Analysis to Detect Unstable Power System Oscillations, Jun. 24, 2009.

Schweitzer Engineering Laboratories, Inc., Case Study, POWERGRID Corporation—India, Using Wide-Area Synchrophasor Measurements to Improve System Reliability, Sep. 10, 2010.

Schweitzer Engineering Laboratories, Inc., SEL-3378 Instruction Manual, Apr. 4, 2008.

Schweitzer Engineering Laboratories, Inc., SEL-3530 Real-Time Automation Controller RTAC Instruction Manual, Sep. 15, 2009.

Terry L. Conrad, Distributed State Estimator at U.S. Virgin Islands Water and Power Authority St. Thomas and St. John, NASPI Working Group Meeting, Mar. 7, 2008.

Pserc-Ali Abur andMladen Kezunovic, Sakis Meliopoulos, Enhanced State Estimation by Advanced Substation Monitoring, Power Systems Engineering Research Center, Nov. 2002.

Saman A. Zonouz and William H. Sanders, A Kalman-based Coordination for Hierarchical State Estimation: Algorithm and Analysis, 2008.

Sasa Jakovljevic, Mladen Kezunovic, Software for Enhanced Monitoring in Integrated Substations, 2003 IEEE Bologna Power Tech Conference, Jun. 23-26, 2003.

Y. Wu, M. Kezunovic, Automatic Simulation of IED Measurements for Substation Data Integration Studies, Power Engineering Society General Meeting, Jun. 12-16, 2005.

Sasa Jakovljevic, Data Collecting and Processing for Substation Integration Enhancement, May 2003.

M. Kezunovic, G. Latisko, Automated Monitoring Functions for Improved Power System Operation and Control, Power Engineering Society General Meeting, Jun. 12-16, 2005.

PCT/US2011/046437 International Search Report and Written Opinion of the International Searching Authority, Patent Cooperation Treaty, Dec. 16, 2011.

Arshad Saleem, Agent Services for Situation Aware Control of Power Systems with Distributed Generation, 2009 IEEE [retrieved on Jan. 28, 2013 from the internet <url:http://orbit.dtu.dk/fedora/objects/orbit:55496/datastreams/file_3761170/content> ].

Chanin Choniratisai, HVDC Stability Functions and Implementation in Thailand, CEPSI 2004. [retrieved on Jan. 28, 2013 from the internet <URL://http://www.researchgate.net/CEPSI2004> ].

PCT/US2012/0068962 International Search Report and Written Opinion of the International Searching Authority, Patent Cooperation Treaty, Feb. 25, 2013.

(56) References Cited

OTHER PUBLICATIONS

Xiaoming Wang, Vijay Vittal, System Islanding Using Minimal Cutsets with Minimum Net Flow, IEEE Power Systems Conference and Exposition, Oct. 2004.
Robert J. Best, D. John Morrow, David J. McGowan, Peter A. Crossley, Synchronous Islanded Operation of a Diesel Generator, IEEE Transactions on Power Systems, vol. 22, No. 4, Nov. 2007.
Olof Samuelsson, Helga Johannsdottir, Nils Gustavsson, Thorhallur Hrafnsson, Daniel Karlsson, Mike Kockott, Johan Salj, Arve Sollie, Power System Damping in Iceland Based on Phasor Measurements, Jul. 2, 2006.
Gabriel Benmouyal, E. O. Schweitzer, A. Guzman, Synchronized Phasor Measurement in Protective Relays for Protection, Control, and Analysis of Electric Power Systems, 29th Annual Western Protective Relay Conference, Oct. 22-24, 2002.
A.G. Phadke, Synchronized Phasor Measurement in Power Systems, IEEE Comput. Appl., vol. 6, No. 2, pp. 10-15, Apr. 1993.
Edmund O. Schweitzer, III, David Whitehead, Armando Guzman, Yanfeng Gong, Marcos Donolo, Advanced Real-Time Synchrophasor Applications, Western Protective Relay Conference, Oct. 2008.
Dale Williston, Dale Finney, Consequences of Out-of-Phase Reclosing on Feeders with Distributed Generators, Dec. 3, 2010.
Michael J. Thompson, Fundamentals and Advancements in Generator Synchronizing Systems, Dec. 9, 2010.
Michael J. Thompson, New Developments in Generator Synchronizing Systems, Feb. 10, 2011.
PCT/US2012/055107 Patent Cooperation Treaty, International Search Report and Written Opinion of the International Searching Authority, Nov. 23, 2012.
A.P. Sakis Meliopoulos, George J. Cokkinides, Floyd Galvan, Bruce Fardanesh, Distributed State Estimator-Advances and Demonstration, 41st Annual Hawaii International Conference on System Sciences, Jan. 2008.
Saman A. Zonouz and William H. Sanders, A Kalman-based Coordination for Hierarchical State Estimation: Algorithm and Analysis, 41st Annual Hawaii International Conference on System Sciences, Jan. 2008.
ABB: Improved Power System Performance through Wide Area Monitoring, Protection, and Control, Jan. 2004.
ABB, Wide Area Measurement, Monitoring, Protection, and Control Industrial IT for Energy System Operation, Jan. 2003.
G.T. Heydt, C.C. Liu, A.G. Phadke, V. Vittal, Solutions for the Crisis in Electric Power Supply, IEEE Computer Applications in Power, Jul. 2001.
Luc Meysenc, M. Jylhakallio, Peter Barbosa, Power Electronics Cooling Effectiveness Versus Thermal Inertia, IEEE Transactions on Power Electronics, vol. 20, No. 3, May 2005.
R.A. Walling, N.W. Miller, Distributed Generation Islanding-Implications on Power System Dynamic Performance, IEEE Power Enginnering Society Summer Meeting vol. 1, Jul. 25, 2002.
M. Ezzt, M.I. Marei, M. Abdel-Rahman, M.M. Mansour, A Hybrid Strategy for Distributed Generators Islanding Detection, IEEE PES Power Africa 2007 Conference and Exposition Johannesburg, South Africa, May 16-20, 2007.
Mats Larsson, Christian Rehtanz, Predictive Frequency Stability Control Based on Wide-Area Phasor Measurements, IEEE Power Engineering Society Summer Meeting vol. 1, Jul. 2002.
Jun Yin, Liuchen Chang, Chris Diduch, Recent Developments in Islanding Detection for Distributed Power Generation, IEEE Power Engineering, Jul. 2004.
Xiaoming Wang, Vijay Vittal, System Islanding Using Minimal Cutsets with Minimum Net Flow, IEEE Power Systems Conference and Exposition, Oct. 2014.
Dongchen Hu, Vaithianathan Venkatasubramanian, New Wide Area Algorithms for Detection and Mitigation of Angle Instability Using Synchrophasors, IEEE Power Engineering Society General Meeting, Jun. 2007.

* cited by examiner

SYSTEMS AND METHODS FOR BLACKOUT PROTECTION

RELATED APPLICATIONS

This application is a continuation-in-part of U.S. patent application Ser. No. 13/195,227 filed Aug. 1, 2011 titled "SYSTEMS AND METHODS FOR UNDER-FREQUENCY BLACKOUT PROTECTION", which claims priority to U.S. Provisional Patent Application No. 61/376,348, filed Aug. 24, 2010, titled "WIDE AREA UNDER-FREQUENCY BLACKOUT PROTECTION SYSTEM," both of which are hereby incorporated by reference in their entirety. This continuation-in-part application further claims priority to U.S. Provisional Patent Application No. 61/592,829, filed Jan.31, 2012, titled "SYSTEMS AND METHODS FOR UNDER-FREQUENCY BLACKOUT PROTECTION," which is also hereby incorporated by reference in its entirety.

TECHNICAL FIELD

This disclosure relates to systems and methods for controlling and protecting an electric power delivery system and, more particularly, to systems and methods for wide-area under-frequency blackout protection in an electric power delivery system.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments described are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Electrical power generation and delivery system equipment may be monitored and protected from various malfunctions and/or conditions using one or more IEDs. For example, an IED may be configured to protect the electrical power system equipment from abnormal conditions, such as when the power generation capabilities of the electrical power system cannot adequately supply system loads. Under this unbalanced system condition, power loss or blackouts may occur that negatively affect both providers of electric power and their customers. Consistent with embodiments disclosed herein, an IED may utilize techniques to minimize blackout conditions on a larger portion of the electric power delivery system such as under-frequency (UF) load shedding techniques and over-frequency (OF) generation shedding or runback techniques.

Power imbalances in an electrical power delivery system may be associated with a fall (or rise) in the frequency of the electrical power system fundamental voltage. Consistent with embodiments disclosed herein, when a threshold UF (or OF) level is crossed, loads may be disconnected (e.g., shed) from the electrical power system or generators or other active power producing components on the electric power system may be shed or run-back to rebalance the system. By shedding selective loads, shedding generators, or running back generators or other active power producing power system components and rebalancing the system, the negative effects of unbalanced system conditions may be mitigated.

Figure 1:
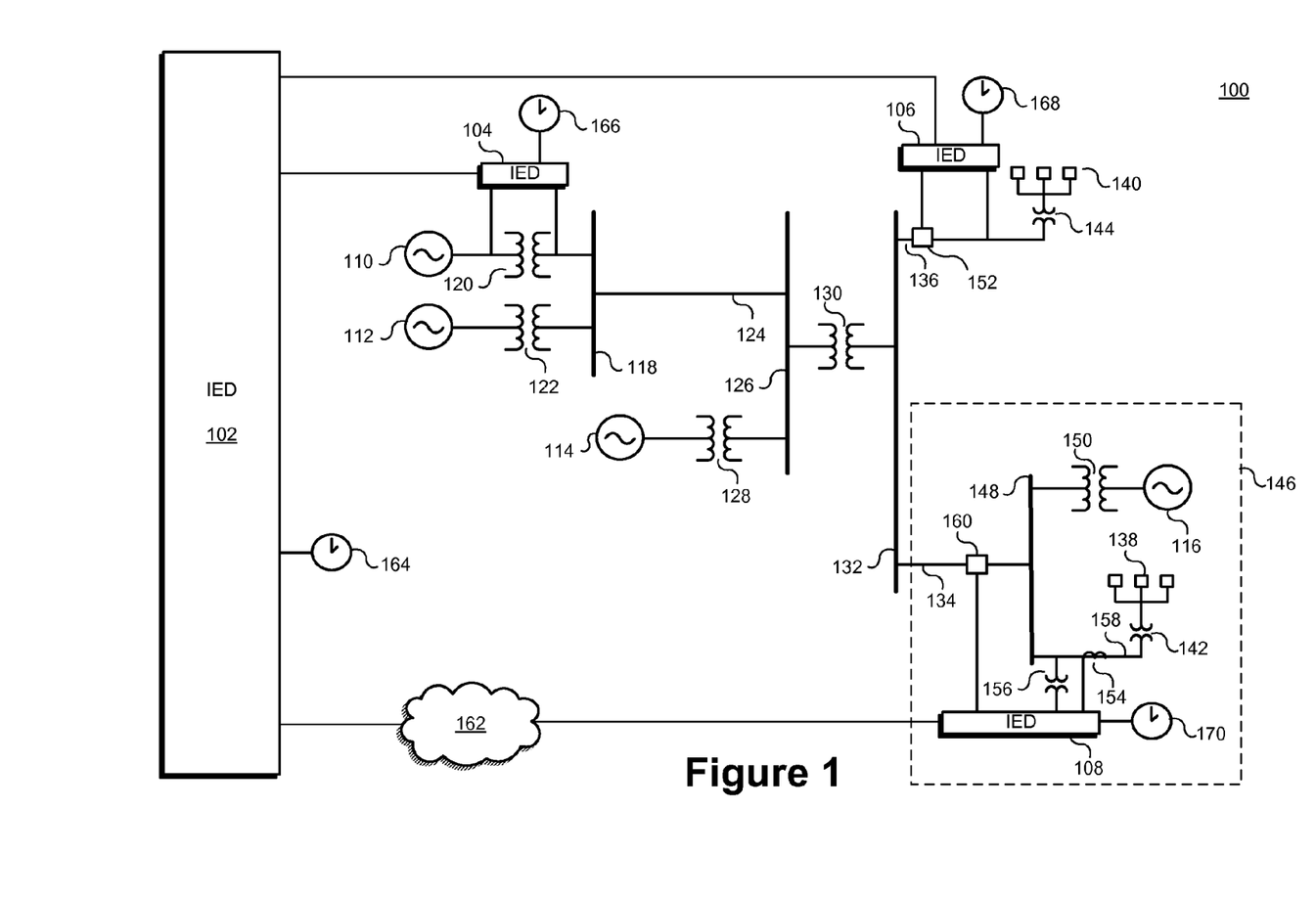
FIG. 1 illustrates a simplified diagram of one embodiment of an electric power delivery system that includes intelligent electronic devices.

FIG. 1 illustrates a simplified diagram of an electric power generation and delivery system 100 that includes IEDs 102-108 consistent with embodiments disclosed herein. Although illustrated as a one-line diagram for purposes of simplicity, electrical power generation and delivery system 100 may also be configured as a three phase power system. Moreover, embodiments disclosed herein may be utilized by any electric power generation and delivery system and is therefore not limited to the specific system 100 illustrated in FIG. 1. Accordingly, embodiments may be integrated, for example, in industrial plant power generation and delivery systems, deep-water vessel power generation and delivery systems, ship power generation and delivery systems, distributed generation power generation and delivery systems, and utility electric power generation and delivery systems.

The electric power generation and delivery system 100 may include generation, transmission, distribution, and power consumption equipment. For example, the system 100 may include one or more generators 110-116 that, in some embodiments, may be operated by a utility provider for generation of electrical power for the system 100. Generators 110 and 112 may be coupled to a first transmission bus 118 via step up transformers 120 and 122, which are respectively configured to step up the voltages provided to first transmission bus 118. A transmission line 124 may be coupled between the first transmission bus 118 and a second transmission bus 126. Another generator 114 may be coupled to the second transmission bus 126 via step up transformer 128 which is configured to step up the voltage provided to the second transmission bus 126. Generators, as used herein may refer to any equipment capable of supplying electric power on an electric power delivery system, and may include, for example, rotating synchronous or induction machines or other electronic power producing equipment with an inverter capable of supplying electric power (photovoltaic, wind power, battery, and the like).

A step down transformer 130 may be coupled between the second transmission bus 126 and a distribution bus 132 configured to step down the voltage provided by the second transmission bus 126 at transmission levels to lower distribution levels at the distribution bus 132. One or more feeders 134, 136 may draw power from the distribution bus 132. The feeders 134, 136 may distribute electric power to one or more loads 138, 140. In some embodiments, the electric power delivered to the loads 138, 140 may be further stepped down from distribution levels to load levels via step down transformers 142 and 144, respectively.

Feeder 134 may feed electric power from the distribution bus 132 to a distributed site 146 (e.g., a refinery, smelter, paper production mill, or the like). Feeder 134 may be coupled to a distribution site bus 148. The distribution site 146 may also include a distributed generator 116 configured to provide power to the distribution site bus 148 at an appropriate level via transformer 150. In some embodiments, the distributed generator 116 may comprise a turbine configured to produce electric power from the burning of waste, the use of waste heat, or the like. The distribution site 146 may further include one or more loads 138. In some embodiments, the power provided to the loads 138 from the distribution site bus 148 may be stepped up or stepped down to an appropriate level via transformer 142. In certain embodiments, the distribution site 146 may be capable of providing sufficient power to loads 138 independently by the distributed generator 116, may utilize power from generators 110-114, or may utilize both the distributed generator 116 and one or more of generators 110-114 to provide electric power to the loads.

IEDs 102-108 may be configured to control, monitor, protect, and/or automate the electric power system 100. As used herein, an IED may refer to any microprocessor-based device that monitors, controls, automates, and/or protects monitored equipment within an electric power system. An IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. In some embodiments, IEDs 102-108 may gather status information from one or more pieces of monitored equipment. Further, IEDs 102-108 may receive information concerning monitored equipment using sensors, transducers, actuators, and the like. Although FIG. 1 illustrates separate IEDs monitoring a signal (e.g., IED 104) and controlling a breaker (e.g., IED 108), these capabilities may be combined into a single IED.

FIG. 1 illustrates various IEDs 102-108 performing various functions for illustrative purposes and does not imply any specific arrangements or functions required of any particular IED. In some embodiments, IEDs 102-108 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, valve position, exciter status, magnetic flux conditions, circuit breaker status, tap status, meter readings, and the like. Further, IEDs 102-108 may be configured to communicate calculations, such as phasors (which may or may not be synchronized as synchrophasors), events, fault distances, differentials, impedances, reactances, frequency, and the like. IEDs 102-108 may also communicate settings information, IED identification information, communications information, status information, alarm information, and the like. Information of the types listed above, or more generally, information about the status of monitored equipment, may be generally referred to herein as monitored system data.

In certain embodiments, IEDs 102-108 may issue control instructions to the monitored equipment in order to control various aspects relating to the monitored equipment. For example, an IED (e.g., IED 106) may be in communication with a circuit breaker (e.g., breaker 152), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. In another example, an IED may be in communication with a synchronous generator exciter to raise or lower field current, voltage, and/or flux conditions. In another example, an IED may be in communication with a generator speed governor or other electronic devices to modify the position of fuel valves, air louvers, condensing or extraction valves, steam bypass valves, compressor speeds, hydraulic pilot valves. Information of the types listed above, or more generally, information or instructions directing an IED or other device to perform a certain action, may be generally referred to as control instructions.

The distribution site 146 may include an IED 108 for monitoring, controlling, and protecting the equipment of the distributed site 146 (e.g., generator 116, transformer 142, etc.). IED 108 may receive monitored system data, including current signals via current transformer (CT) 154 and voltage signals via potential transformer (PT 156) from one or more locations (e.g., line 158) in the distribution site 146. The IED 108 may further be in communication with a breaker 160 coupled between the feeder 134 and the distribution site bus 148. In certain embodiments, the IED 108 may be configurable to cause the breaker 160 to disconnect the distribution site bus 148 from the distribution bus 132, based on monitored system data received via CT 154 and PT 156.

Feeder 136 may be communicatively coupled with an IED 106 configured to control a breaker 152 between the loads 140 and the distribution bus 132 based on monitored system data. In some embodiments, the power provided to the loads 140 from the distribution bus 132 may be stepped up or stepped down to an appropriate level via transformer 144. Like the IED 108 of the distribution site 146, monitored system data may be obtained by IED 106 using CTs and/or PTs (not shown).

Other IEDs (e.g., IED 104) may be configured to monitor, control, and/or protect the electric power generation and delivery system 100. For example IED 104 may provide transformer and generator protection to the step-up transformer 120 and generator 110. In some embodiments, IEDs 104-108 may be in communication with another IED 102, which may be a central controller, synchrophasor vector processor, automation controller, programmable logic controller (PLC), real-time automation controller, Supervisory Control and Data Acquisition (SCADA) system, or the like. For example, in some embodiments, IED 102 may be a synchrophasor vector processor, as described in U.S. Patent Application Publication No. 2009/0088990, which is incorporated herein by reference in its entirety. In other embodiments, IED 102 may be a real-time automation controller, such as is described in U.S. Patent Application Publication No. 2009/0254655, which is incorporated herein by reference in its entirety. IED 102 may also be a PLC or any similar device capable of receiving communications from other IEDs and processing the communications therefrom. In certain embodiments, IEDs 104-108 may communicate with IED 102 directly or via a communications network (e.g., network 162).

The central IED 102 may communicate with other IEDs 104-108 to provide control and monitoring of the other IEDs 104-108 and the power generation and delivery system 100 as a whole. In some embodiments, IEDs 104-108 may be configured to generate monitored system data in the form of time-synchronized phasors (i.e., synchrophasors) of monitored currents and/or voltages. IEDs 104-108 may calculate synchrophasor data using a variety of methods including, for example, the methods described in U.S. Pat. Nos. 6,662,124, 6,845,333, and 7,480,580, which are herein incorporated by reference in their entireties. In some embodiments, synchrophasor measurements and communications may comply with the IEEE C37.118 protocol. In certain embodiments, IEDs 102-108 may receive common time signals for synchronizing collected data (e.g., by applying time stamps for the like). Accordingly, IEDs 102-108 may receive common time signals from time references 164-170 respectively. In some embodiments, the common time signals may be provided using a GPS satellite (e.g., IRIG), a common radio signal such as WWV or WWVB, a network time signal such as IEEE 1588, or the like.

Consistent with embodiments disclosed herein, IEDs 102-108 may be configured to determine a power system operating frequency from monitored system data. The operating frequency of the power system may be determined using many methods including, for example, measuring time between zero-crossings of voltage and/or current, measuring positive-sequence phasor rotations, measuring time between period voltage and/or current peaks, and/or the like. IEDs 102-108 may be further configured to indicate when an operating frequency falls below a predetermined level. In certain embodiments, an IED may have a number of different UF levels and may indicate when an operating frequency falls below one or more of the UF levels.

Figure 2:
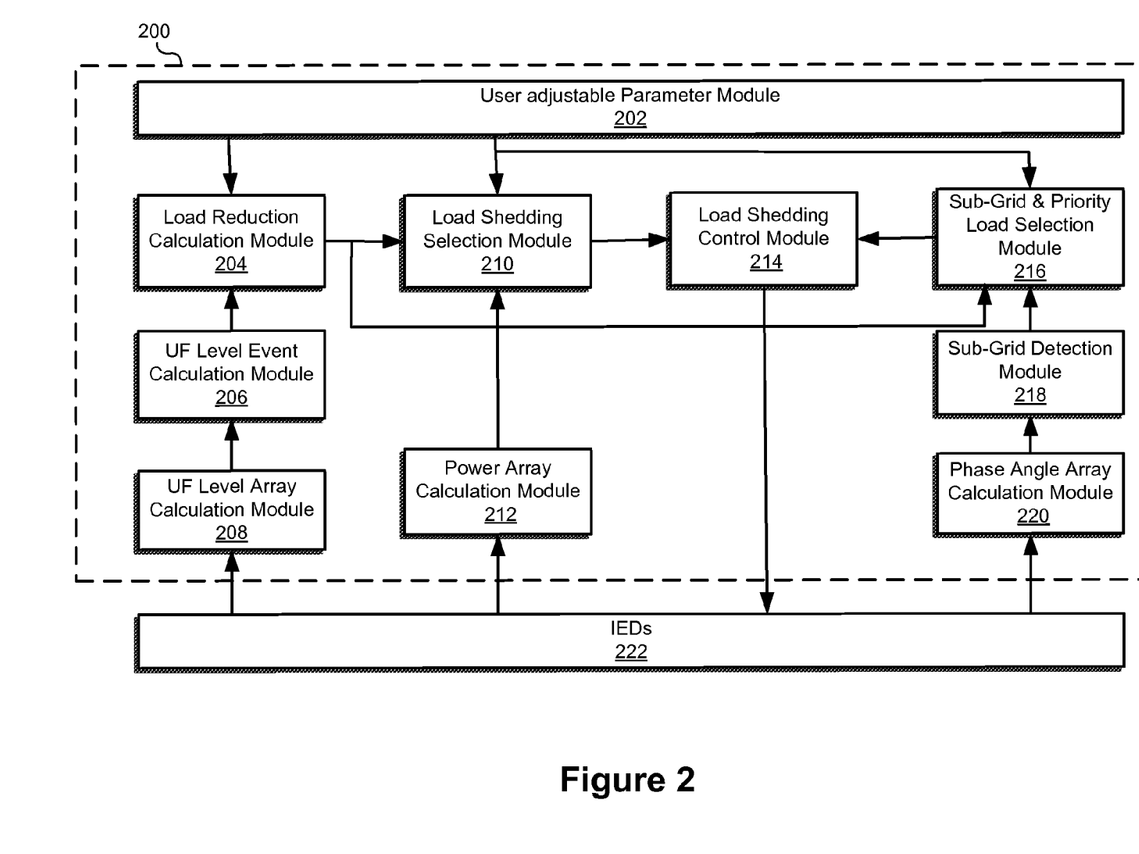
FIG. 2 illustrates a block diagram of one embodiment of an intelligent electronic device for protection and control of an electric power delivery system

FIG. 2 illustrates a block diagram of an IED 200 for protection and control of an electric power delivery system (e.g., system 100 illustrated in FIG. 1). IED 200 may communicate with one or more IEDs 222 configured to provide indications of UF events (e.g., when system operating frequencies fall below one or more UF levels) to IED 200. In some embodiments, IEDs 222 may receive monitored system data and, based on the monitored system data, provide indications of UF events such as when measured operating frequencies fall below one or more UF levels to the IED 200.

In some embodiments, IEDs 222 may be programmed with a predetermined UF set point (e.g., level) and be configured to provide time synchronized indications of UF events to the IED 200. In some embodiments, IEDs 222 may include one or more set points (e.g., levels) and be configured to provide time synchronized indications of UF events (e.g., when one or more of the set points are crossed) to the IED 200. Further, in certain embodiments, IEDs 222 may indicate the UF set point (e.g., level) breached, a time indication of the UF event, the power consumed by a load associated with the IED, and/or synchrophasor data which may include a load angle.

Based on the UF event indications received from IEDs 222, IED 200 may determine whether specific loads are exhibiting UF events and whether such loads can be disconnected (e.g., shed) to limit and/or avoid UF events and systems disturbances. This functionality may be achieved using one or more functional modules 202-220 included in the IED 200. For example, indications of UF events (e.g., breached UF set points, time indications of UF events, power consumed by loads associated with the IEDs 222, and/or synchrophasor data) detected by IEDs 222 may be provided to a UF level array calculation module included in the IED 200. In certain embodiments, UF level array calculation module 208 may be configured to order UF events and their associated information based on time stamps indicating when the UF events were received by their associated IEDs 222 (e.g., UF events may be ordered based on their time of occurrence). Information from the UF level array calculation module 208, including one or more ordered UF events may be provided to a coinciding UF level event calculation module 206. The UF level event calculation module 206 may be configured to determine whether the one or more UF events ordered by the UF level array calculation module 208 are associated with a larger system UF event based on the time stamps associated with the one or more UF events. For example, the UF level event calculation module 206 may determine that a particular set of UF events ordered by the UF level array calculation module 208 are associated with a larger system UF event based on their occurrence within a particular time period (e.g, a 10 ms period). Based on the UF events occurring within a particular time period, the UF level array calculation module 208 may determine that the loads associated with the UF events are associated with a power sub-grid experiencing a UF condition and provide this information to a load reduction calculation module 204.

The IED 200 may also include a user adjustable parameter module 202 that, in some embodiments, includes parameters defining an amount of load to be shed for a particular UF-level. In some embodiments, the amount of load to be shed may be in the form of a power/frequency value (e.g., MW/Hz). Information regarding the amount of load to be shed for a particular UF-level may be provided to the load reduction calculation module 204. The load reduction calculation module 204 may also utilize information regarding the UF events provided by the UF level array calculation module 208 and UF level event calculation module 206, including time indications of UF events and indications of UF set points breached. Based on the information received by the load reduction calculation module 204, the load reduction calculation module 204 may determine an amount of load to shed (e.g., the amount of load to shed from the system measured in MW) based on the defined user parameters and the other received UF event information.

IEDs 222 may be further configured to monitor the power consumed by the loads they are associated with. Information regarding the power consumed by loads associated with the IEDs 222 may be monitored in terms of power (e.g., MW) or other coupled parameters such as current. For example, in reference to FIG. 1, IED 106 may be capable of monitoring the power consumed by loads 140, and IED 108 may be capable of indicating the power presented consumed by the distributed site 146.

Consistent with some embodiments, information regarding the power consumed by loads may be provided to a power array calculation module 212 included in the IED 200. In some embodiments, the power array calculation module 212 may calculate a power consumption value for each load (e.g., by using parameters coupled to power consumption such as current). Further, the power array calculation module 212 may sort and/or order specific loads based on their associated power consumption.

The user adjustable parameter module 202 may include a parameter that includes a priority indication for loads associated with the IEDs 222. For example, the priority indication may include a priority queue indicating the order in which loads should be shed from the system in the event of an UF condition. Accordingly, the priority indication may indicate certain loads (e.g., a hospital) that should stay connected to the system in the event of an UF condition.

The information generated by the power array calculation module 212 may be provided to a load shedding selection module 210 included in the IED 200 along with the priority indication provided by the user adjustable parameter module 202. The load shedding selection module 210 may further receive information related to an amount of load to shed from the load reduction calculation module 204. Based on the received information (e.g., the amount of load to shed, the priority of the loads, and the amount of power consumed by the loads), the load shedding selection module 210 may determine which loads should be shed to reduce the effects of the detected UF event in the system. That is, the load shedding selection module 210 may match the amount of power to shed with the power used by each of the loads, prioritized by the priority information, and determine which loads to shed.

In some embodiments, the IED 200 may include a load shedding control module 214 configured to receive an indication from the load shedding selection module 210 of which loads should be shed and provide a control signal to the IEDs 222 associated with the loads that should be shed directing the IEDs 222 to shed (e.g., disconnect) the relevant loads from the system. For example, in reference to FIG. 1, the load shedding selection module 210 may determine that loads 140 should be shed, and the load shedding control module 214 may direct the IED 106 associated with the loads 140 to trip breaker 152, thereby disconnecting the loads from the system 100.

Information regarding power sub-grids within a greater grid topology of an electric power delivery system may also be used by the IED 200 to calculate which loads should be shed in view of UF conditions. In this context, IEDs 222 may provide load angle information (e.g., synchrophasor information) to a phase angle array calculation module 220 included in the IED 200. In an electric power generation and delivery system, equipment (e.g., loads) associated with a certain power sub-grid of the electric power generation and delivery system may experience similar frequency decay rates when the system experiences an UF condition. Similarly, equipment associated with different power sub-grids may experience different frequency decay rates when the system experiences an UF.

For example, in a system having two sub-grids within a greater grid topology of an electric power delivery system, the probability of both sub-grids experiencing the same frequency decay rate in a system UF condition is low. In certain conditions, the frequency in one sub-grid may increase while the frequency in the other sub-grid may decrease. Moreover, even in conditions where both sub-grids exhibit a decay in frequency, the frequency decays will likely reach set UF threshold levels at differing times. Based on the above, by analyzing the decay rates and times of loads within a system, the IED 200 may determine which loads are associated with a particular power sub-grid. For example, if certain loads exhibit similar frequency decay rates occurring at similar times (e.g., within a 2 ms period), the IED 200 may determine that the loads are associated with a particular power sub-grid. In some embodiments, IED 200 and its associated modules 202-220 may determine which loads are associated with a particular power sub-grid based on the methods described in U.S. Patent Application Publication No. 2009/0089608 which is herein incorporated by reference in its entirety.

To enable the IED 200 to determine which loads are associated with a particular power sub-grid, IEDs 222 may communicate time-synchronized load phase measurements to IED 200 using, for example, the IEEE C38.118 protocol. Load angles measured by the IEDs 222 may be provided to the phase angle array calculation module 220 that, in some embodiments, may store such information. The phase angle array calculation module 220 may provide the measured load angles to a sub-grid detection module 218. Based on the measured load angles, the sub-grid detection module 218 may determine whether loads associated with the IEDs 222 are associated with particular sub-grids.

Information regarding which loads are associated with particular sub-grids may be provided to a sub-grid and priority based load selection module 216. The sub-grid and priority based load selection module 216 may also receive the parameter that includes a priority indication for loads associated with the IEDs 222 from the user adjustable parameter module 202. Additionally, the sub-grid and priority based load selection module 216 may receive an indication of the amount of load to be shed from the load reduction calculation module 204.

Based on the information related to which loads are associated with particular sub-grids, the priority information for the loads, and/or the amount of load to be shed, the sub-grid and priority based load selection module 216 may determine which loads should be shed by the system to reduce the effects of UF conditions. This information may be provided by the sub-grid and priority based load selection module 216 to the load shedding control module 214. The load shedding control module 214 may then use this information in conjunction with the information received from the load shedding selection module 210 to determine which loads should be shed and direct the appropriate IEDs 222 to shed the loads from the system.

In some embodiments, the modules 202-220 included in IED 200 may be implemented in a programmable IED system. For example, the functionality of IED 200 may be achieved using a synchrophasor vector process (e.g., the SEL-3378 available from Schweitzer Engineering Laboratories, Inc.) or a real-time automation controller (e.g., the SEL-3530 available from Schweitzer Engineering Laboratories, Inc.).

Figure 3:
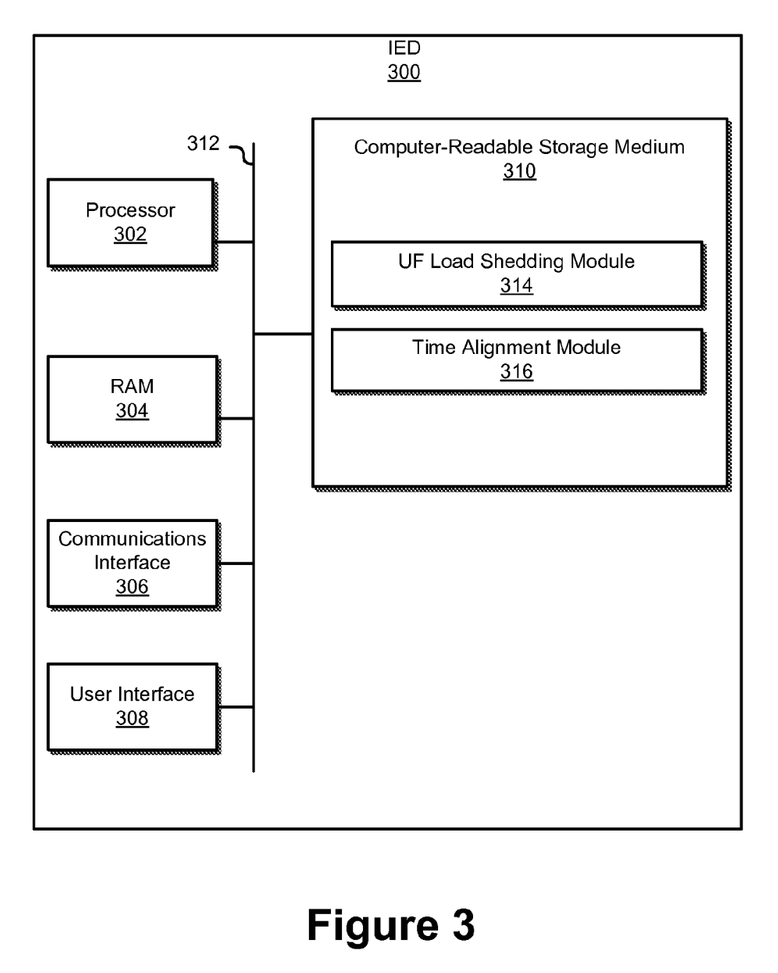
FIG. 3 illustrates another block diagram of one embodiment of an intelligent electronic device for protection and control of an electric power delivery system.

FIG. 3 illustrates another block diagram of an IED 300 for protection and control of an electric power delivery system. As illustrated, IED 300 may include a processor 302, a random access memory (RAM) 304, a communications interface 306, a user interface 308, and a non-transitory computer-readable storage medium 310. The processor 302, RAM 304, communications interface 306, user interface 308, and computer-readable storage medium 310 may be communicatively coupled to each other via a common data bus 312. In some embodiments, the various components of IED 300 may be implemented using hardware, software, firmware, and/or any combination thereof.

The user interface 308 may be used by a user to enter user defined settings such as, for example, an amount of load to shed for each event level, load priority information, and the like (e.g., the parameters included in the user adjustable parameter module 202 of FIG. 2). The user interface 308 may be integrated in the IED 300 or, alternatively, may be a user interface for a laptop or other similar device communicatively coupled with the IED 300. Communications interface 306 may be any interface capable of communicating with IEDs and/or other electric power system equipment communicatively coupled to IED 300. For example, communications interface 306 may be a network interface capable of receiving communications from other IEDs over a protocol such as the IEC 61850 or the like. In some embodiments, communications interface 306 may include a fiber-optic or electrical communications interface for communicating with other IEDs.

The processor 302 may include one or more general purpose processors, application specific processors, microcontrollers, digital signal processors, FPGAs, or any other customizable or programmable processing device. The processor 302 may be configured to execute computer-readable instructions stored on the computer-readable storage medium 310. In some embodiments, the computer-readable instructions may be computer executable functional modules configured to implement certain systems and methods disclosed herein when executed by the processor. For example, the computer-readable instructions may include an UF load shedding module 314 configured to cause the processor to perform the UF load shedding operations and a time alignment module 316 used time-aligning and coordinating various communications to and from IEDs connected to the IED, as described in reference to FIG. 2. The computer-readable instructions may also include any of the functional modules described in reference to FIG. 2 to implement the functionality of the IED 300 described therein.

Figure 4:
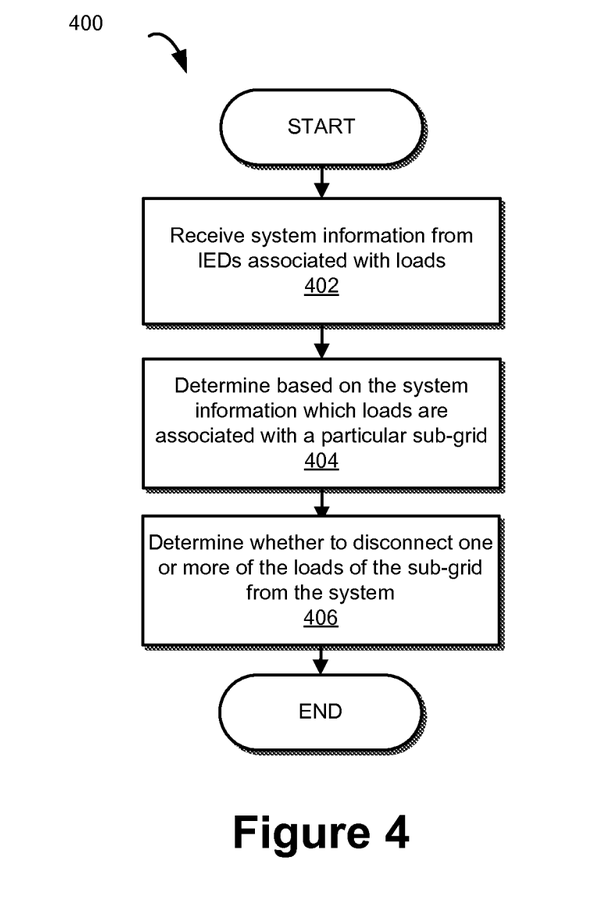
FIG. 4 illustrates one embodiment of a method for protection and control of an electric power delivery system.

FIG. 4 illustrates one embodiment of a method 400 for protection and control of an electric power delivery system. At 402, a central IED may receive system information from a remote IEDs each associated with a load. In certain embodiments, the system information may include information relating to the operating frequencies of the loads, the power consumption of the loads, synchrophasor information, an indication that an operating frequency of a load has reached a predetermined level, and the like. Based on this system information, at 404, the central IED may determine which loads are associated with a particular sub-grid of the electric power delivery system experiencing an UF condition. In certain embodiments, determining which loads are associated with a particular sub-grid of the electric power delivery system is based on the decay rates and/or decay times of operating frequencies of the loads. At step 406, the central IED may determine whether to disconnect one or more loads associated with the sub-grid from the electric power delivery system to mitigate the UF condition, sending a signal to IEDs associated with the one or more loads directing the IEDs to disconnect the loads. As discussed above, in some embodiments, determining which loads to disconnect from the electric power delivery system may be based on priority information associated with the loads.

In certain implementations of embodiments disclosed herein, each load in a system may have an associated IED that may be similar or identical IEDs. IEDs associated with a load may be configured to monitor a machine rotor angle of a load, an operating frequency, a rate of change of the operating system frequency, and/or power consumption of the load. Each generator in the system may also have an associated IED that may be similar or identical IEDs. IEDs associated with a generator may be configured to monitor a machine rotor angle, an operational frequency, a rate of change of operation frequency, and power production of the generator.

Consistent with embodiments disclosed herein, island formation may be detected by time-correlation of frequency deviations in operating system frequency information received from IEDs associated with generators and/or loads. Frequency deviations may be detected by comparing received operating system frequency information with one or more under frequency and/or over frequency (OF) thresholds. In certain embodiments, these thresholds may be the same for IEDs associated with both loads and generators.

Figure 5:
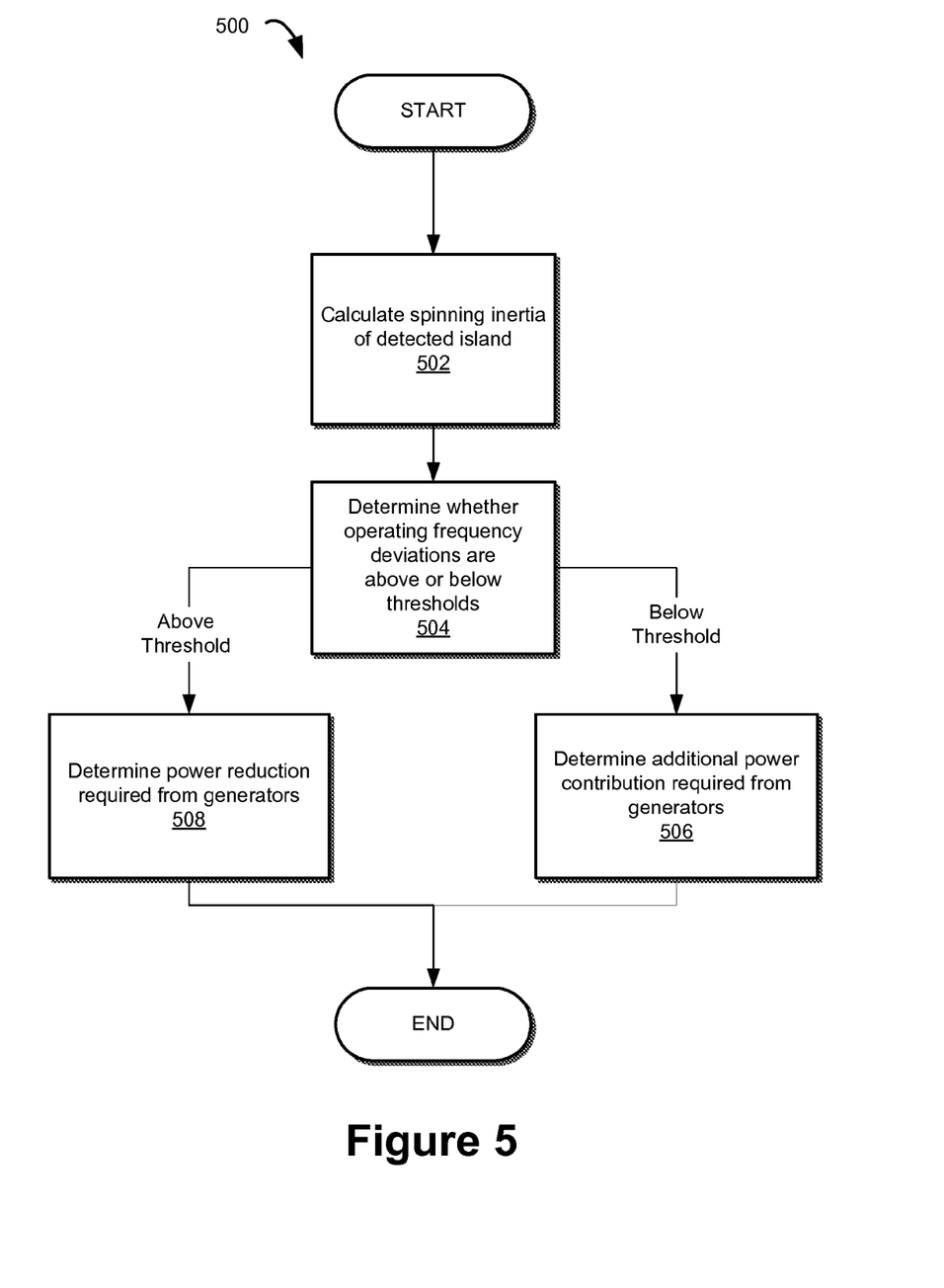
FIG. 5 illustrates another embodiment of a method for protection and control of an electric power delivery system that utilizes rotating inertia information from the system.

FIG. 5 illustrates another embodiment of a method 500 for protection and control of an electric power delivery system that utilizes rotating inertia information from the system. Particularly, the illustrated method 500 may be utilized to determine an amount of load and/or power generator to shed to mitigate a UF or OF condition. Rotating inertia information may be expressed in terms of kg m$^2$ or any other suitable convention including seconds x MVA rating. In certain embodiments, rotating inertia information for one or more loads of the system may be entered by a user into one or more associated IEDs. Similarly, rotating inertia information for one or more generators of the system may be entered by the user into one or more associated IEDs.

At 502, a total spinning inertia associated with one or more detected islands (e.g., a particular sub-grid of the electric power delivery system determined using embodiments disclosed herein) may be calculated. The total spinning inertia of a detected island may be denoted as "H". In certain embodiments, the total spinning inertia of a detected island may be calculated by summing together the rotating inertia information for loads and/or generators associated with the detected island.

At 504, a determination may be made whether detected operating frequency deviations of detected islands are above or below certain thresholds. If frequency deviations are below set thresholds (e.g., in an UF condition), at 506, an amount of additional mechanical power contribution required from generators associated with the island may be predicted according to a formula utilizing an operating frequency, a rate of change of the operating frequency, and a total spinning inertia of the detected island (i.e., "H"). In certain embodiments, the additional mechanical power may be denoted as "Pacc" and may be measured in Watts. An amount of load to be shed in the detected island may be calculated based on the predicted additional mechanical power contribution, a load priority list, and a measured power consumption of each load in the detected island. In embodiments where system generators include fast feed-forward increase capability (e.g., generator "run-up" capabilities), in lieu of shedding loads, the additional mechanical power required by the Pacc term can be accomplished by quickly increasing the power output of generators. For example, power electronic based generation such as photovoltaic, battery, or other similar power electronic inverter style generation may use such run-up to quickly increase the power output of the generators.

If frequency deviations are above set thresholds (e.g., in an OF condition), at 508, an amount of mechanical power reduction required from the generators associated with the island may be predicted according to a formula utilizing the operating frequency, the rate of change of the operating frequency, and the total spinning inertia of the detected island (i.e., "H"). In certain embodiments, the amount of mechanical power reduction may be measured in Watts. An amount of power generation to be shed in the detected island may be calculated based on the predicted amount of mechanical power reduction, a generator priority list, and a measured power production of each generator in the detected island. In embodiments where system generators include fast feed-forward reduction capability (e.g., generator "run-back" or "load rejection" capabilities), the amount of generator Watts to be reduced may instead be achieved by running back generation instead of tripping generators offline with circuit breakers.

Certain embodiments of the systems and methods disclosed herein may be implemented using various suitable approaches. For example, in some embodiments, methods utilizing time-synchronized phasors (synchrophasors) may be utilized. Machine rotor angle information, operating frequency information, a rate of change of the operating frequency, and power consumption values of generators and/or loads in a detected island may be sent from remote IEDs associated with the generators and/or loads to one or more centralized IEDs operating as central controller(s). Utilizing this information, the one or more centralized IEDs may perform the aforementioned methods to determine which loads and/or generators should be sent trip signals and/or run-back or reject signals.

In certain embodiments, determining an amount of load to shed, which may be expressed in terms of Pacc, may be calculated according to the following:

$$J_{system} = J_{generator\_1} + J_{generator\_2} + \cdots J_{generator\_n} + J_{load\_1} + J_{load\_2} + \cdots J_{load\_n} \quad (1)$$

$$H_{system} = \frac{J_{system}}{2MVA_{rating}} \quad (2)$$

$$Pacc = 2H_{system} fRoCoF \quad (3)$$

where $J_{system}$ is the rotating inertia of the system, $J_{generator\_n}$ is the rotating inertia of a particular generator included in the system, $J_{load\_n}$ is the rotating inertia of a particular load included in the system, $H_{system}$ is the total spinning inertia of the system, Pacc is the amount of additional mechanical power contribution required or amount of load to be shed, f is the operating frequency, and RoCoF is the rate of change of the operating frequency.

In certain embodiments, the one or more centralized IEDs may be an SEL-1102 controller (available from Schweitzer Engineering Laboratories, Inc.) that communicates to one or more remote IEDs such as SEL-751 relays (available from Schweitzer Engineering Laboratories, Inc.) via one or more channels (e.g., one or more C37.118 channels). For example, an illustrative system may include three generators and twelve sheddable loads. Five SEL-751 relays may be associated with the three generators, each having an H of 4 seconds and a 100 MVA rating. Ten SEL-751's may be associated with the twelve sheddable loads, each having an H of 0.5 seconds and a 30 MVA rating. Each of the generators may produce 100 MW and each of the loads may consume 25 MW.

An UF event having a 59 Hz UF level and a RoCoF of 2 Hz/sec may occur with two generators and eight loads experiencing UF events within 6 milliseconds of each other. Utilizing Equations 1-3, a solution for preventing a blackout condition caused by an underfrequency event may be determined. For example, based on the above described illustrative system parameters, $J_{generator}$ for each generator is 800 kg-m², $J_{load}$ for each load is 30 kg-m², $J_{system}$ the island experiencing the UF event is system of 1,840 kg-m², $H_{system}$ of the island is 9.2 seconds, and Pacc power deficiency is therefore 60 MW. Three of the 25 MW loads may be selected for shedding (i.e., totally 75 MW collectively), ensuring that the island does not experience a blackout condition.

Utilizing Equations 1-3, a solution for preventing a blackout condition caused by an OF event may also be determined. For example, based on the above described illustrated system parameters, $J_{system}$ of the island experiencing an OF event is 2,460 Mkg-m², $H_{system}$ of the island experiencing the OF event 12.3 seconds, and Pacc power excess is therefore 187 MW. To ensure the island does not experience a blackout condition, one of the 100 MW generators may be shed, while another may be run-back to 87 MW output to account for the 187 MW of excess power.

Certain embodiments of the systems and methods disclosed herein may also utilize a binary method to prevent a blackout condition. For example, in some embodiments, one or more remote IEDs associated with loads and/or generators in a system may store operating frequencies and one or more RoCoF thresholds. The one or more remote IEDs may generate quantized and/or binary representations of the operating frequencies and a RoCoF based on a comparison with the one or more RoCoF thresholds and transmit this information to one or more centralized IEDs operating as a centralized controller. The one or more remote IEDs may further transmit power consumption and generation information from associated loads and/or generators. Based on the information received from the one or more remote IEDs, the one or more centralized IEDs may determine an estimated Hand Pacc for the system utilizing, at least in part, Equations 1-3 . Utilizing the estimated H and Pacc, the one or more centralized IEDs may determine which loads and/or generators of the system should be sent trip signals and/or run-back or reject signals.

An illustrative system implementing embodiments disclosed herein may comprise one or more centralized IEDs that may be an SEL-1102 controller (available from Schweitzer Engineering Laboratories, Inc.), communicating with one or more remote IEDs such as SEL-751 relays (available from Schweitzer Engineering Laboratories, Inc.) via one or more binary communication channels (e.g., one or more MirorredBits®). For example, an illustrative system may include three generators and twelve sheddable loads. Five SEL-751 relays may be associated with the three generators, each having an H of 4 seconds and a 100 MVA rating. Ten SEL-751's may be associated with the twelve sheddable loads, each having an H of 0.5 seconds and a 30 MVA rating. Each of the generators may produce 100 MW and each of the loads may consume 25 MW.

An UF event having a 59 Hz UF level and a RoCoF of <5 Hz/sec may occur with two generators and eight loads experiencing UF events within 6 milliseconds of each other. Utilizing Equations 1-3, a solution for preventing a blackout condition caused by the underfrequency event may be determined. For example, based on the above described illustrative system parameters and binary representations of the system information, $J_{generator}$ for each generator is 800 kg-m², $J_{load}$ for each load is 30 kg-m², $J_{system}$ of the island experiencing the UF event is 1,840 kg-m², $H_{system}$ of the island is 9.2 seconds, and Pacc power deficiency may be calculated as 75 MW. Three of the 25 MW loads may be selected for shedding (i.e., totally 75 MW collectively), ensuring that the island does not experience a blackout condition.

Utilizing Equations 1-3, a solution for preventing a blackout condition caused by an OF event in the aforementioned system may also be determined. For example, an OF event having a 61 Hz UF level and a RoCoF of <5 Hz/sec may occur with three generators and two loads experiencing OF events within 3.5 milliseconds of each other. Based on the above described illustrated system parameters, $J_{system}$ of the island experiencing the OF event is 2,460 kg-m², $H_{system}$ of the island experiencing the OF event 12.3 seconds, and Pacc power excess is therefore 104 MW. To ensure the island does not experience a blackout condition, one of the 100 MW generators may be shed, while another may be run-back to 96 MW output to account for the 104 MW of excess power.

The quantized and/or binary representations of the operating frequencies and/or RoCoF may introduce certain errors associated with the binary simplification. For example, in the above-detailed exemplary OF event, the binary simplification may introduce an 83 MW error into the calculated excess power Pacc. The island may survive (i.e., not experience a blackout condition) if the generator can sufficiently cover the 83 MW error introduced by the simplification. If the generator cannot sufficiently cover the error, the OF in the island will accelerate to another OF threshold level. In the above-detailed example, if the generator cannot sufficiently cover the 83 MW, the OF event may rise to an operating frequency of 62 Hz and a RoCoF of <5 Hz/sec. Based on the above described illustrated system parameters, $J_{system}$ of the island experiencing the OF event is 1,660 kg-m², $H_{system}$ of the island experiencing the OF event 8.3 seconds, and Pacc power excess is therefore 71 MW. To ensure the island does not experience a blackout condition, the generator may be run-back to 71 MW, reducing the error introduced by the binary simplification to 12 MW, thereby preventing a blackout condition.

In some embodiments, load composition factors of each sheddable load may be entered into the one or more remote IEDs associated with system loads and/or the one or more centralized IEDs. This information may be aggregated from loads associated with a detected island to determine a total load composition factor for the island. Load compensation factors may be entered based on voltage dependency or frequency dependency or based on standard load categories including, for example, various P/Q modeled loads, P/V modeled loads, P/f modeled loads or the like. Load compensation factors may also be entered as a relative factor of direct connected induction motors, synchronous motors, electronic loads, resistive loads, or the like. Loads may be further categorized by load characteristics of direct connected induction motors and synchronous motors. Loads may then calculated by the one or more remote and/or centralized IEDs to determine the totalized load characteristic of each detected island, which may be referred to as "$R_L$." The total $R_L$ of a detected island may be calculated by summing together the $R_L$ of all loads which are associated to the detected island.

Interconnected grids such as those associated with large utilities may be associated with boundaries imposed by utility company ownership of transmission and distribution capabilities. Islands may form that include interconnected areas of multiple utility companies, each of the areas being independently operated and having localized blackout prevention technologies. To utilize the aforementioned systems and methods to prevent blackout conditions in islands spanning across interconnected grids associated with multiple utilities, generator and load information may be provided on one or more centralized IEDs. The one or more centralized IEDs may then share total inertia information, load compensation information, and Pacc calculations with one or more IEDs associated with particular portions of the grid. Localized blackout prevention technologies may use this system-wide information to take localized blackout prevention measures.

While specific embodiments and applications of the disclosure have been illustrated and described, it is to be understood that the disclosure is not limited to the singular configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electrical system from OF conditions, wherein power generation would be shed rather than load to reduce effects on the system. Accordingly, many changes may be made to the details of the above-described embodiments without departing from the underlying principles of this disclosure. The scope of the present disclosure should, therefore, be determined only by the following claims.

What is claimed is:

1. A system for managing an electric power delivery system comprising:
    a first plurality of intelligent electronic devices (IEDs), each IED of the first plurality of IEDs being communicatively coupled with a load, wherein each IED of the first plurality of IEDs is configured to obtain load information from a plurality of loads, and wherein each IED of the first plurality of IEDs is configured to selectively disconnect a load from the electric power delivery system;
    a second plurality of IEDs, each IED of the second plurality of IEDs being communicatively coupled with a corresponding generator, wherein each IED of the second plurality of IEDs is configured to obtain generator information from the corresponding generator, and wherein each IED of the second plurality of IEDs is configured to selectively modify load or generation on the electric power delivery system; and
    a central IED communicatively coupled with the first and second plurality of IEDs, the central IED being configured to:
    receive the load and generator information;
    obtain operating frequencies of the loads and calculate decay rates of the operating frequencies;
    when an operating frequency of a load has reached a predetermined under- frequency level, determine which loads are associated with a same sub-grid, wherein loads with similar decay rates are determined to be associated with the same sub-grid;
    based on the load and generator information, determine an amount of generation or load to be modified; and,
    signal appropriate IEDs of the first and second plurality of IEDs to modify associated generation or load;
    wherein the load information comprises information relating to a rotating inertia of the one or more loads and the generator information comprises rotating inertia of the one or more generators;
    wherein the decay rates comprise times at which operating frequencies reach a predetermined under-frequency level.

2. The system of claim 1, wherein the second plurality of IEDs is configured to selectively disconnect the corresponding generator from the electric power delivery system.

3. The system of claim 1, wherein the second plurality of IEDs is configured to selectively run-back the corresponding generator.

4. The system of claim 1, wherein the second plurality of IEDs is configured to selectively run-up the corresponding generator.

5. The system of claim 1, wherein the load information further comprises one or more selected from the group consisting of: rotor angle; operating frequency; rate of change of operating frequency; and power consumption.

6. The system of claim 1, wherein the generator information further comprises one or more selected from the group consisting of: rotor angle; operating frequency; rate of change of operating frequency; and power consumption.

7. The system of claim 1, wherein the central IED is further configured to determine a system rotating inertia based on the received load and generator information.

8. The system of claim 7, wherein the central IED is further configured to determine an operating frequency based on the load and generator information.

9. The system of claim 8, wherein the central IED is further configured to determine an amount of additional power contribution required from the generators based on a comparison between the operating frequency and one or more predetermined thresholds and to signal appropriate IEDs of the first and second plurality of IEDs to shed an appropriate amount of load based thereon.

10. The system of claim 8, where the central IED is further configured to determine an amount of power reduction from the generators based on a comparison between the operating frequency and one or more predetermined thresholds and to signal appropriate IEDs of the first and second plurality of IEDs to shed an appropriate amount of generation based thereon.

11. The system of claim 1, wherein the load and generator information comprise synchronized phasor information.

12. The system of claim 1, wherein the load and generator information comprise binary information.

13. The system of claim 1, wherein the central IED is further configured to receive load composition information from the first plurality of IEDs and to determine an appropriate amount of load to shed based thereon.

14. The system of claim 1, wherein the central IED detects island formation by time-correlation of the received load and generation information.

15. The system of claim 1, wherein the central IED comprises a first central IED, the system further comprising a second central IED, the first and second central IEDs being associated with different interconnected grids, and the first and second central IEDs configured to share load information.

16. A method for managing an electric power delivery system using a central intelligent electronic device (IED) comprising:
    receiving, at the central IED from a first plurality of IEDs, each of the first plurality of IEDs being communicatively coupled with a load, load information comprising rotating inertia information of a plurality of loads;
    obtaining operating frequencies of the loads and, based on the operating frequencies, calculate decay rates of the operating frequencies;
    when an operating frequency of a load has reached a predetermined under-frequency level, determining which loads are associated with a same sub-grid, where loads with similar decay rates are determined to be associated with the same sub-grid;

receiving, at the central IED from a second plurality of IEDs, each of the second plurality of IEDs being communicatively coupled with a respective generator, generator information comprising rotating inertia information of the generators;

determining, by the central IED, an amount of generation or load to modify based on the load and generator information; and signaling, by the central IED, appropriate IEDs of the first and second plurality of IEDs to modify associated generation or load based on the determined amount of generation or load to modify;

wherein the decay rates comprise times at which operating frequencies reach a predetermined under-frequency level.

17. The method of claim 16, wherein the amount of generation or load to modify comprises an amount of generation to shed, and the signaling comprises signaling appropriate IEDs to shed associated generation based on the determined amount of generation to shed.

18. The method of claim 16, wherein the amount of generation or load to modify comprises an amount of generation to run-back, and the signaling comprises signaling appropriate IEDs to run-back associated generation based on the determined amount of generation to run-back.

19. The method of claim 16, wherein the amount of generation or load to modify comprises an amount of generation to run-up, and the signaling comprises signaling appropriate IEDs to run-up associated generation based on the determined amount of generation to run-up.

20. The method of claim 16, wherein the load information further comprises one or more selected from the group consisting of: rotor angle; operating frequency; rate of change of operating frequency; and power consumption.

21. The method of claim 16, wherein the generator information further comprises one or more selected from the group consisting of: rotor angle; operating frequency; rate of change of operating frequency; and power consumption.

22. The method of claim 16, wherein the method further comprises:
determining, by the central IED, a system rotating inertia based on the received load and generator information.

23. The method of claim 22, wherein the method further comprises:
determining, by the central IED, an operating frequency based on the received load and generator information.

24. The method of claim 23, wherein the method further comprises:
determining, by the central IED, an amount of additional power contribution required from the generators based on a comparison between the operating frequency and one or more predetermined thresholds; and
signaling, by the central IED, to appropriate IEDs of the first and second plurality of IEDs to shed an appropriate amount of load based thereon.

25. The method of claim 23, wherein the method further comprises:
determining, by the central IED, an amount of power reduction from the generators based on a comparison between the operating frequency and one or more predetermined thresholds; and
signaling, by the central IED, to signal appropriate IEDs of the first and second plurality of IEDs to shed an appropriate amount of generation based thereon.

26. The method of claim 16, wherein the load and generator information comprise synchronized phasor information.

27. The method of claim 16, wherein the load and generator information comprise binary information.

28. The method of claim 16, wherein the method further comprises:
receiving, by the central IED from the first plurality of IEDs, load composition information; and
determining, by the central IED, an appropriate amount of load to shed based on the load composition information.

29. The method of claim 16, further comprising detecting island formation by time-correlation of the received load and generation information.

30. The method of claim 16, wherein the central IED comprises a first central IED, the method further comprising:
first central IED sharing load information with a second central IED, the first and second central IEDs being associated with different interconnected grids.

31. An intelligent electronic device (IED) associated with an electric power delivery system comprising:
an interface configured to receive:
load information from a first plurality of IEDs, each of the first plurality of IEDs being communicatively coupled with a load and configured to selectively disconnect a load from the electric power delivery system, the load information comprising rotating inertia information of a plurality of loads and operating frequencies of the plurality of loads, and
generator information from a second plurality of IEDs, each of the second plurality of IEDs being communicatively coupled with a respective generator and configured to selectively disconnect the respective generator from the electric power delivery system, the generator information comprising rotating inertia information of the respective generators;
a processor communicatively coupled to the interface; and
a non-transitory computer-readable storage medium communicatively coupled to the processor, the computer-readable storage medium storing instructions that when executed by the processor, cause the processor to:
based on the operating frequencies of the loads, calculate decay rates of the operating frequencies;
when an operating frequency of a load has reached a predetermined under-frequency level, determine which loads are associated with a same sub-grid, where loads with similar decay rates are determined to be associated with the same sub-grid;
determine an amount of generation to shed, run-back, or run-up, or load to be shed based on the load and generator information and to signal appropriate IEDs of the first and second plurality of IEDs to shed, run-back, or run-up associated generation or shed associated load based on the determined amount of generation to be shed, run-back, or run-up, or load to be shed;
wherein the decay rates comprise times at which operating frequencies reach a predetermined under-frequency level.

32. The IED of claim 31, wherein the interface is further configured to share load information from the first plurality of IEDs and generator information from the second plurality of IEDs with a central IED associated, where the IED and the central IED are associated with different interconnected grids.

* * * * *